(12) United States Patent
Liberman et al.

(10) Patent No.: US 7,022,360 B2
(45) Date of Patent: Apr. 4, 2006

(54) METHOD OF PRODUCING A FROZEN MARINATED RECONSTITUTED MEAT PRODUCT

(75) Inventors: Barnet Louis Liberman, New York, NY (US); Peter H. Glidden, Windsor, CT (US)

(73) Assignee: Winterlab Limited, New York, NY (US)

( * ) Notice: Subject to any disclaimer, the term of this patent is extended or adjusted under 35 U.S.C. 154(b) by 346 days.

(21) Appl. No.: 10/375,837

(22) Filed: Feb. 26, 2003

(65) Prior Publication Data

US 2004/0166212 A1   Aug. 26, 2004

(51) Int. Cl.
    *A23L 1/314*   (2006.01)
    *A23L 1/318*   (2006.01)

(52) U.S. Cl. .............. 426/240; 426/513; 426/524; 426/641; 426/272

(58) Field of Classification Search ............ 426/264, 426/524, 641, 513, 240, 272; 62/62, 64
See application file for complete search history.

(56) References Cited

U.S. PATENT DOCUMENTS

| | | | |
|---|---|---|---|
| 3,650,765 A | * | 3/1972 | Smadar et al. ............ 426/291 |
| 3,756,231 A | | 9/1973 | Ross |
| 4,214,514 A | * | 7/1980 | Contino et al. ............ 99/330 |
| 4,601,909 A | | 7/1986 | Nagoshi |
| 4,654,217 A | | 3/1987 | Nagoshi |
| 4,657,768 A | | 4/1987 | Nagoshi |
| 4,689,963 A | | 9/1987 | Sakai |
| 4,743,343 A | | 5/1988 | Sakai |
| 4,840,034 A | | 6/1989 | Liberman |
| 4,840,035 A | | 6/1989 | Liberman |
| 5,001,047 A | | 3/1991 | Liberman |
| 5,472,725 A | * | 12/1995 | Mendenhall ............ 426/521 |
| 5,807,598 A | | 9/1998 | Liberman et al. |
| 5,863,578 A | | 1/1999 | Guarino |
| 6,248,381 B1 | | 6/2001 | Liberman et al. |

* cited by examiner

*Primary Examiner*—Arthur L. Corbin
(74) *Attorney, Agent, or Firm*—Cohen, Pontani, Lieberman & Pavane

(57) ABSTRACT

An improved method of marinating and reconstituting meat from trims of fish, poultry, pork, beef or the like comprises the steps of freezing the trims, adding marinade to the frozen trims and compressing the frozen trims to a sufficient pressure to lower the freezing point below the temperature of the frozen trims such that the marinade is diffused through the trims and purge is formed on the outer surface of the trims so as to hold the trims together.

16 Claims, 1 Drawing Sheet

METHOD OF PRODUCING A FROZEN MARINATED RECONSTITUTED MEAT PRODUCT

BACKGROUND OF THE INVENTION

1. Field of the Invention

The present invention relates to a method of reconstituting and marinating meat from trims of fish, poultry, pork, veal or the like. In particular, the present method enables meat to be reconstituted and marinated while still in a frozen state.

2. Description of the Related Art

Various methods have been devised to reconstitute meat from trims or scrap pieces of beef, veal, pork, fish, poultry or the like for maximizing recovery of meat products therefrom. One known method of reconstituting meat makes use of binding agents for holding pieces of trims together so that the reconstituted meat does not fall apart during cooking. The known method includes the steps of coating fresh, i.e. not previously frozen, trims with a commercially available binding agent or binder, packing the trims in a mold, then allowing the binding agent to cure at about 35° F. for one hour. An example of a commercially available binder contains 0.5% trans-glutaminase, 2.5% sodium polyphosphate, 2.5% anhydrous sodium pyrophosphate, 2.0% sillicon dioxide, and 92.5% casein. Another example of a binding agent contains 75.0% protein (from milk and/or egg) and 25.0% calcium chloride and/or sodium chloride.

However, the conventional binding agents added to the reconstituted meat are "chemicals" that many consumers deem undesirable for consumption. In addition, the binding agent sometimes gives the reconstituted meat an "unnatural" resiliency or flavor. Thus, adding binding agents decreases the marketability of the reconstituted meat.

U.S. Pat. No. 5,807,598 discloses methods of reconstituting meat absent conventional binding agents. The patent teaches the use of the "purge", i.e. the natural fluid released from ruptured cells of previously frozen animal tissue when defrosted, which typically collects on the outer surface of the defrosted meat, to substitute for the conventional binding agent. The "purge" contains an adequate amount of cellular protein, which functions as a "glue" by, for example, becoming denatured and cross-linked and gelatinous in nature and forms an adhesive or cohesive bond between adjoining trims such that the meat trims are joined, adhered or otherwise held together. To produce an adequate amount of "purge", the meat trims need to be frozen first and then defrosted.

U.S. Pat. No. 6,248,381 discloses a method for reconstituting meat by compressing frozen trims to a sufficient pressure to lower the freezing point below the temperature of the frozen trims. The desired amount of "purge" is formed by an external force on the outer surface of the frozen trims. This method neither requires the trims to be defrosted by warming nor the use of any artificial agent for holding the meat trims together.

U.S. Pat. No. 5,863,578 relates to a method for packaging seafood wherein pieces of seafood such as shrimp or fish filets are marinated or coated in a sauce, placed on a pallet, vacuum sealed in a bag, and flash frozen by blast freezing, contact freezing, or tunnel freezing.

These patents, however, neither teach nor suggest a process for producing a frozen marinated and reconstituted meat product without using conventional binders and without the need to first freeze and then thaw the meat product.

SUMMARY OF THE INVENTION

Accordingly, an object of the present invention is to provide a method for marinating and reconstituting meat from trims or scrap pieces of fish, poultry, beef or pork or the like such that the marinated and reconstituted meat is closely similar to a marinated whole-meat product in terms of its appearance, taste, resiliency and aroma.

An embodiment of the method to produce the marinated and reconstituted meat product in accordance with the present invention includes the steps of:

a. freezing the trims;
 b. adding marinade to the frozen trims;
 c. compressing the frozen trims with marinade to a sufficient pressure to enable the marinade to diffuse through the trims and to form purge on the outer surface of the trims so as to hold the trims together.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate and procedures described herein.

DETAILED DESCRIPTION OF THE PRESENTLY PREFERRED EMBODIMENTS

Figure 1:
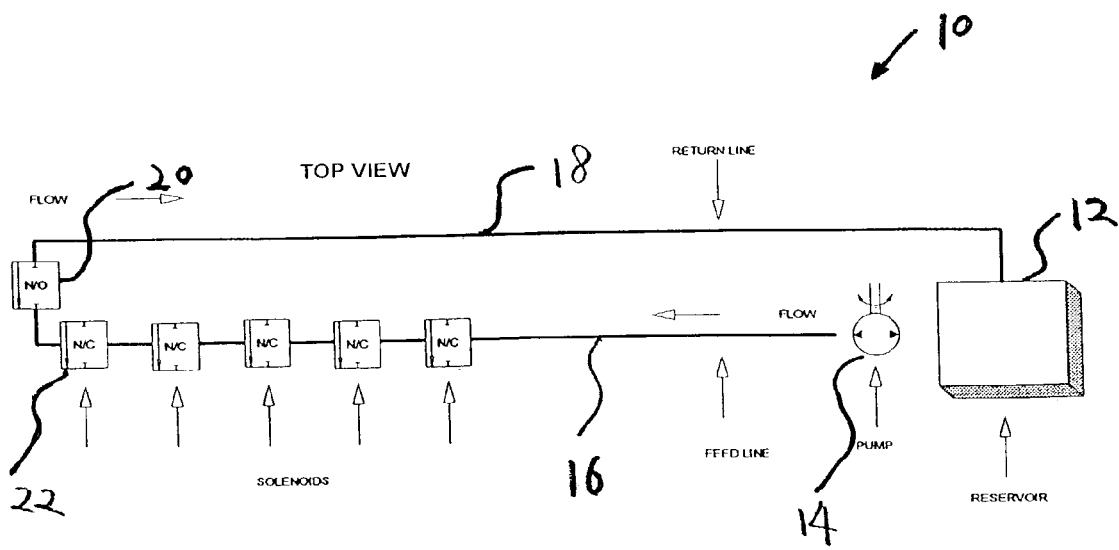
FIG. 1 is a system diagram showing the addition of the marinade to the frozen meat trims prior to compression.

As used herein the term "meat" is intended to include fish, shell-fish, poultry, beef, veal, pork including ham, various game meats such as venison, liver meat and any other type of animal product commonly referred to as meat or fish.

As used herein, the term "trims" is intended to include not only pieces of meat trimmed from a larger piece, but also to include other small pieces such as scraped, ground, flaked meat, or any other small portion of meat suitable for being held together to form a lager product.

The term "marinade" refers to a liquid mixture, usually of vinegar or wine and oil with various spices and herbs, in which meat, fowl, fish, and vegetables are soaked before cooking. The term "marinate" means soaking (food) in such a mixture.

The term "marinated and reconstituted meat product" is a marinated product comprising a plurality of small pieces or bits of meat, i.e. trims as above defined, which are held together to form a larger product such as, for example, a portion size product.

According to the invention, the marinade is placed on the frozen trims before the frozen trims are compressed but not to be spread all over the frozen trim. As disclosed in U.S. Pat. No. 6,248,381, the reconstitution of meat trims can be accomplished using the "purge" as a natural binder to hold the meat trims together. Since the freezing point of the "purge" decreases as the pressure increases, the "purge" can be produced at a temperature below the freezing point of the trims at an atmospheric pressure by increasing the pressure on the frozen meat product. The production of the "purge"

is thus accomplished by raising pressure during the compression step rather than by raising temperature. The contents of U.S. Pat. No. 6,248,381 is incorporated herein by reference in its entireties.

The marinade added to the frozen trims is greatly diffused through the frozen trims as a result of compression due to the raised pressure and the resultant decreased freezing point. After release of the pressure, frozen trims are marinated, reconstituted and resume their fully frozen state.

In accordance with a preferred embodiment of the present invention, the first step of preparing a piece of reconstituted meat from the trims of fish, poultry, beef, pork or the like is to freeze the trims of such products, if they are not yet frozen, to about −15° F., for example. This produces a minimal but yet an adequate amount of ruptured meat cells to provide sufficient purge to bind the trims. While this initial freezing step may be accomplished by means of a blast freezer or any other conventional freezing methods, preferably, the trims are frozen using the "cooled-brine method" (TruFresh®) disclosed in U.S. Pat. Nos. 4,601,909; 4,654,217; 4,657,768; 4,689,963; 4,743,343; 4,840,034; 4,840,035 and 5,001,047, the contents of which are incorporated herein by reference in their entireties. As described therein, the cooled-brine method, unlike conventional freezing methods, advantageously maintains the freshness or tastiness of the meat by maintaining maximum cellular integrity of the meat tissue and minimizing the number of ruptured cells during the freezing process.

Although brine solutions of various compositions, as disclosed in the aforementioned patents may be used, the presently preferred brine composition includes, by weight, about 43.18% water, about 44.06% propylene glycol, about 12.75% calcium chloride, and about 0.01% rapeseed oil. The temperature of the brine should be between about −22° and 46° F., and preferably between about −37° and −41° F.

After the initial freezing, the frozen meat trims are marinated by adding a desired amount of marinade. The process of marinating the frozen meat trims involves variables including but not limited to the type of meat trims, the type of marinade and the thickness of the meat trim product, etc. It is apparent that the amount of marinade can be determined in consideration of any variables affecting the marination. A relative large amount of marinade may be desirable for trims of tough beef, for example, but it is generally not so desired for trims of delicate fish.

After the marinade is added, the frozen meat trims are preferably placed in a mold to define the shape of the final product and are then pressed by an external force so that the marinade is diffused through the frozen meat trims and the requisite amount of purge to bind these trims is produced. The amount of purge produced should be at least about 3% but most preferably about 4–6% by weight of the product so as to minimize degradation to the meat.

While any methods and devices for reconstituting meat trims by external forces are applicable for the intended purpose, the commercially available pressing machines, such as, for example, Ross Presses including Ross Uniform 914 Press, manufactured by Ross Industries, Inc, Midland, Va., and the devices disclosed in U.S. Pat. No. 3,756,231 issued to Ross, are preferred. The properties and methods of operation of these machines are described in the manufacturer's brochures or in U.S. Pat. No. 3,756,231, the contents of which are herein incorporated by references in their entireties. As disclosed in the manufacturer brochures, Ross Presses are operated under dwell-timing and pressure control circuitry, which meters the amount of time the food product is under pressure. The operator turns the dial control to the predetermined setting (0–100), based upon the mold size.

In operation, the frozen meat trims are removed from the brine as above described and stored at a temperature between about 0 to 15° F. The Ross Press machine is set at a preselected dwell time of, for example and not by way of limitation, 20 seconds and a preselected pressure of, for example but not by way of limitation, 1000 psi. Then a desired amount of frozen meat trims to be formed are placed in the machine hopper and the machine is turned on. After the preselected dwelling period, the compressed or formed product meat, sometimes in form of log, is removed from the machine.

During the step of compressing, the temperature of the trims must be below the freezing point of the trims at atmospheric pressure and above the freezing point of the trims at the elevated pressures of the press machine. It is noted that the duration, pressure and temperature of this compress-forming step, which can be readily adjusted, depends on the size, weight, surface area and/or density of the marinated and reconstituted meat. Such duration, pressure and temperature should be chosen so as to maintain the integrity of the meat and minimize degradation of the cells while producing sufficient amount of "purge." For example, during the process of compressing, the temperature of the trims can be about 0–15° F., under a pressure of, preferably about 200 to 1500 psi for a period, preferably about 6–60 seconds.

Before this compression step, if desired (although optional in view of the teachings of the present invention), the trims may be treated by placing on the outside surfaces a minimal amount of a binding agent (e.g. about 1% by weight) such as, for example, calcium chloride, sodium chloride, and/or ground dehydrated bone of the meat being processed, to further enhance the cohesive bonds between adjoining trims at the outer surface of the finished product. These trims, either treated or untreated, may then be configured to form a desired or preselected size and shape by, for example, placing or arranging the trims inside at least a portion of a mold or any structure which defines, at least in part, the shape of the reconstituted meat. The mold may be in the shape of, for example, a fish fillet, in the case where the reconstituted meat comprises trims of a salmon or other fish or shaped like a steak or hamburger patty if the meat is beef. In the case of tuna trims, the mold may resemble a tuna steak.

When Ross Presses are used in the compress-forming step, standard molds or custom made molds provided by the manufacturer of Ross Presses may be used.

After the compress-forming step and removal of the marinated and reconstituted meat log from the machine, the marinated and reconstituted meat products are preferably placed at a temperature between about 0 to 15° F. for storage.

The marinated and reconstituted meat may be cut into individual portions having the desired size and weight at a temperature, for example, below 15° F., for users such as restaurateurs. The marinated and reconstituted meat may be cut using any suitable cutting machines such as, for example, Bandsaw made by AEW or Butchboy by Butchboy.

To add flavor, to decontaminate the surfaces of the portion and/or to increase the bodily integrity of the marinated and reconstituted meat, the portions (preferably while still frozen) may be seared over an open flame or in a broiler heated to about 600 to 800° F., for about 2.0 to 6.0 seconds, depending on the shapes and sizes of the portions. It is believed that the searing step causes the tissue fibers at the surface of each portion to interlink thereby enhancing the surface strength of the portions. Optionally, these portions may also be seared through deep-frying, e.g., immersed in boiling oil (preferably, vegetable oil such as sesame oil), for a period of about 10 to 60 seconds. Alternatively or in addition thereto, the portions may be charmarked by passing under charring rings having a temperature of about 1,200 to 1,500° F. for about 2.0 to 3.5 seconds whereby the charring rings rollingly contact the reconstituted meat surface. The char-marking operation causes the tissue fibers in contact with the rings to desiccate through liquefaction or liquification of the component carbohydrates and/or proteins of the tissue fibers. It is believed that the desiccated tissue fibers are more able to maintain the structural integrity of the marinated and reconstituted meat. By charmarking the portions in a crisscross manner, the desiccated tissue fibers act as a reinforcing "net" for the marinated and reconstituted meat. Preferably, after any of these searing and/or charmarking operations, the portions are immediately cooled for a period of between about 1.0 and 5.0 minutes to a surface temperature of between about 30 and 50° F. The portions are then placed in gas-impermeable (or vacuum-sealable) packages and then frozen.

It is noted that these searing and/or char-marking operations are for treating only the outside surfaces of the portions and are not intended to cook through the portions.

Since the portions and their component trims may have collected bacteria during the marinating and reconstitution process, they should be pasteurized or sterilized. The pasteurization process may be performed either before or after the portions are placed in the vacuum sealable packages, and is preferably performed by irradiation means such as, for example, an electronic pasteurization device capable of sending X-ray or E-beam (electron beam) through the thickness of each portion so as to ensure the destruction of all (or a substantial amount of) bacteria, including those residing at the cohesive bonds between the adjoining trims. The packaged portions may thereafter be stored in a conventional freezer environment at about −15°±5° F. for shipment to end-users such as, for example, restaurants, caterers, retail establishments or retail consumers. Thereafter, the end-users may prepare or cook the marinated and reconstituted meat in any number of ways, e.g., boil in a bag, microwave in a bag, broil over direct flame or pan fry (of course, without the bag).

In accordance with the present invention, a preferred embodiment to add marinade is to use a circulating system pumping a desired amount of marinade to the frozen trims before compression. As described in FIG. 1, in a circulating system 10, marinade is added from a reservoir 12 to molds containing frozen trims by a pump 14 through feed lines 16, and back to the reservoir 12 through a return line 18. In this circulating system 10, a normally open solenoid 20 allows unused marinade to return to the reservoir 12 when normally closed solenoids 22 are not activated. Normally closed solenoids 22 allow marinade to enter into the molds containing frozen trims when normally closed solenoids 22 are activated to be open. A switch to activate normally closed solenoids 22 can be installed in this circulating system 10 and connected to a timer. The timer is used to control the activation duration of the normally closed solenoids 22. The desirable amount of marinade, thereby, can be adjusted by set the timer and the flowing rate of the pump 14.

In accordance with the present invention, a preferred embodiment to produce marinated and reconstituted microwavable meat product comprises the following step:
 a. freezing the trims;
 b. adding desired amount of marinade to the frozen trims;
 c. configuring the frozen trims comprising marinade to form a preselected shape;
 d. compressing the configured trims comprising marinade such that the marinate disperses through the configured trims and the "purge" forms on the outer surface of the trims so as to hold the trims together;
 e. cutting the compressed trims into portions having desired size and weight at temperature below the freezing point at the atmosphere pressure of the compressed trims;
 f. searing the outside of the cut portions at a short time so that the core of cut portions remains frozen. For example, the cut portions can be seared very quickly, for example, 5 to 6 seconds, and then be put in a cold tunnel so that the cut portions remain frozen.

It has been noted that the moisture of the marinated and reconstituted meat product can be sealed by the seared surface. The good quality of this meat product is thereby further enhanced and it may be cooked by microwave. After the step of searing, the marinated and reconstituted microwavable meat product then can be packaged and stored in an environment at about −15° F.±5° F. for shipment to end-users where it undergoes a microwave stage to render it fit for final consumption.

While it is presently contemplated to form the frozen marinated and reconstituted meat product from trims, all of which are of the same type of meat, e.g. beef, pork, salmon or tuna, it is within the contemplation of this invention to form frozen marinated and reconstituted meat products from a blend of meats, i.e., trims from different meats such as, for example, beef and pork, and unless otherwise expressly limited, the trims should be construed to include such blends.

It is surprisingly found that the marinade is extremely well diffused through the reconstituted meat product by the extra force in the compressing step. More surprisingly, the marinade does not interfere with the binding effect of "purge" released in the compressing step. Therefore, the marinated and reconstituted meat made in accordance with the present invention is as tasty as marinated whole meat and has qualities that are essentially indistinguishable from those of marinated whole meat. Additionally, the marinated and reconstituted meat does not fall apart during normal cooking conditions. Thus, upon preparing such a frozen product, the user can create a cooked and marinated meat product in one convenient step.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of producing a frozen marinated reconstituted meat product, comprising the steps of:
   a. freezing trims from meat;
   b. adding marinade to the frozen trims; and
   c. compressing and marinating the frozen trims with an external pressure to enable the marinade to diffuse through the trims and to form purge on the outer surface of the trims so as to hold the trims together.

2. The method of claim 1, wherein the trims are frozen in a cooled brine containing from about 0.005% to about 0.018% by weight of a cruciferous oil.

3. The method of claim 1, wherein the frozen trims comprising marinade are compressed at a temperature between about 0° and 15° F.

4. The method of claim 3, wherein the compression is performed at a pressure of between about 200 and 1500 psi for a period of time between about 6 and 60 seconds.

5. The method of claim 1, wherein the frozen trims and marinade are compressed under a pressure between about 200 and 1,500 psi.

6. The method of claim 1, wherein the frozen trims comprising marinade are compressed for a period between about 6 and 60 seconds.

7. The method of claim 1, further comprising a step of searing an outside surface of the compressed trims.

8. The method of claim 1, further comprising a step of char-marking the compressed trims.

9. The method of claim 1, further comprising a step of cutting the compressed trims into individual portions.

10. The method of claim 1, further comprising a step of applying a binding agent to outside surfaces of the frozen trims prior to the step of compressing the trims.

11. The method of claim 1 wherein the marinade is added into the frozen trims through a circulating system.

12. The method of claim 11 wherein the circulating system comprises at least one reservoir, at least one pump, at least one feed line, at least one return line, at least one normally open solenoid, at least one normally closed solenoid, at least one switch and at least one mold to contain the frozen trims, whereby the marinade is added from reservoir to the mold containing frozen trims by the pump through the feed line, when the normally closed solenoid is activated to be open by the switch, and back to the reservoir through the normally open solenoid and the return line when the normally closed solenoid is deactivated to be closed by the switch.

13. The method of claim 12 wherein the circulating system further comprises a timer connected to the switch, whereby the timer is used to control the activation duration of the normally close solenoid.

14. The method of claim 1, further comprising a step of pasteurizing the compressed trims by irradiating the compressed trims with X-ray or electron beam.

15. A method of reconstituting and marinating meat from trims, comprising the steps of:
   a. freezing trims from meat;
   b. adding marinade to the frozen trims;
   c. configuring the frozen trims and marinade to form a preselected shape; and d. compressing and marinating the configured trims at a temperature between about 0° and about 15° F. under a pressure between about 200 and about 1,500 psi for a time period between about 6 and 60 seconds such that the marinade is diffused through the trims and purge is formed on the outer surface of the trims so as to hold the trims together.

16. A method of producing a frozen, reconstituted and marinated microwaveable meat product comprising the steps of:
   a. freezing trims from meat;
   b. adding marinade to the frozen trims;
   c. configuring the frozen trims and the marinade to form a preselected shape;
   d. compressing and marinating the configured trims such that the marinade is diffused through the trims and purge is formed on the outer surface of the trims so as to hold the trims together;
   e. cutting the compressed trims into portions having desired size and weight at temperature below the freezing point at the atmosphere pressure of the compressed trims; and
   f. searing the outside of the cut portions briefly so that the core of the cut portions remains frozen.

* * * * *